July 14, 1970     H. K. GOUGOULAS     3,520,013
VEHICLE CLEANING APPARATUS
Filed July 30, 1968
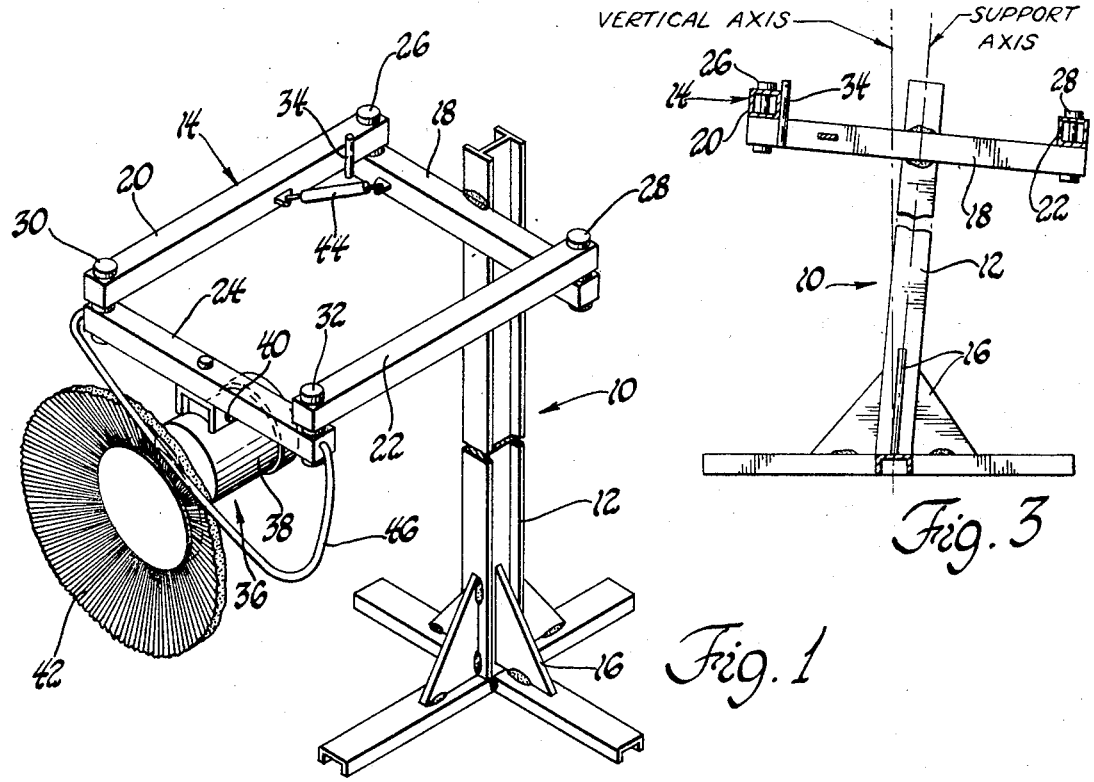
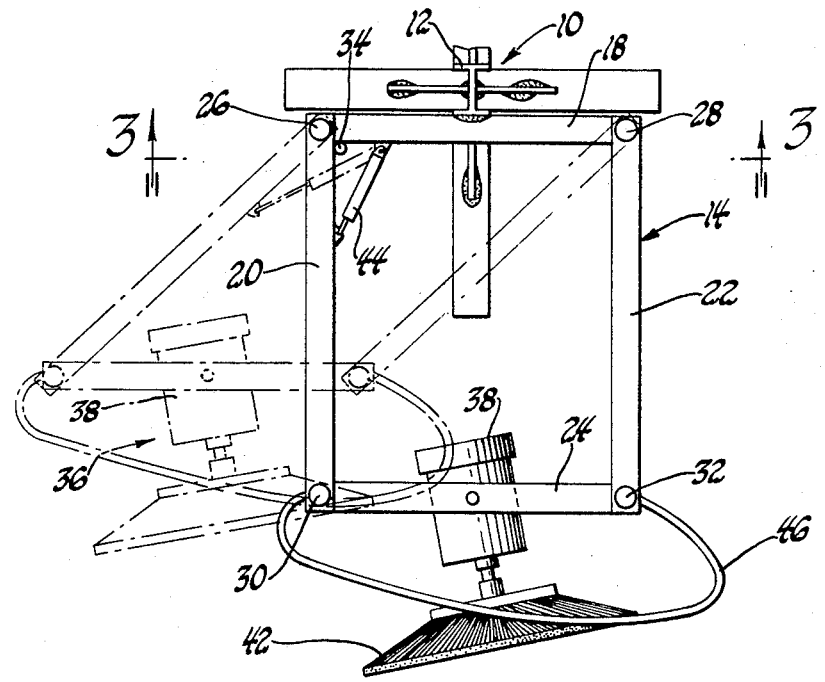
INVENTOR.
Harry K. Gougoulas
BY
Barnard, McGlynn & Reising
ATTORNEYS

United States Patent Office 3,520,013
Patented July 14, 1970

3,520,013
VEHICLE CLEANING APPARATUS
Harry K. Gougoulas, 1875 Philomine,
Lincoln Park, Mich. 48146
Filed July 30, 1968, Ser. No. 748,778
Int. Cl. B60s *3/06*
U.S. Cl. 15—21        8 Claims

ABSTRACT OF THE DISCLOSURE

Vehicle cleaning apparatus comprising an open-faced frusto-conical shaped brush driven by a motor and carried by parallelogram linkage in turn supported by a vertical standard. The parallelogram linkage is gravity biased to a position of maximum extension and automatically senses the width of the vehicle to be cleaned, thereby accommodating itself to many different widths to clean the side surfaces of vehicles.

---

The present invention relates to vehicle cleaning apparatus and more particularly to an open-faced frusto-conical shaped brush specifically designed to clean the side windows of the vehicle.

In semi-automatic car washing plants it is desirable that the maximum surface area of a vehicle be automatically washed so that manual labor is kept to a minimum. In this regard, the windows of a vehicle are particularly susceptible to accumulation of dirt and grease, being on the exterior of a vehicle and being an area susceptible to hand prints and the like, so it is absolutely essential to completely clean the windows of a vehicle in order to satisfy a customer having his vehicle washed. In addition to the foregoing, the windows of a vehicle can also be very readily visually inspected for dirt and grease, and, therefore, this area of the vehicle must necessarily be cleaned thoroughly both to insure safe clear vision from within the vehicle as well as because of the ease with which windows can be inspected.

The prior art devices for use with semi-automatic vehicle washing equipment have attempted several solutions to the foregoing problem. For example, some prior art devices use cylindrical brushes that operate on the side of a vehicle and extend out from a fixed position into interfering engagement with the side of the vehicle to bring about a cleaning thereof. These cylindrical brushes are normally required to wash the side of the vehicle in areas besides the windows and, therefore, they must be adapted to deal with the problems peculiar to each type of cleaning. In addition, vehicles vary in dimension, and the prior art devices are very cumbersome when adapted to adjust for the varying width of the vehicles. In addition, the varied shapes of vehicles require that a great deal more cleaning capability be provided than necessary in a standard installation to insure that the various shapes of vehicle windows are cleaned. These devices particularly compromise in this area because they are necesarily adapted to clean more than just the windows of the vehicle. The reason for this is plainly the high cost of providing such apparatus and, therefore, it is required to do double duty, bringing about a compromise in efficiency when compared with a specialized device for doing each individual type of cleaning on the vehicle.

The prior art has not been responsive to the need for specialized window cleaning apparatus for semi-automatic vehicle washing equipment. The cylindrical shaped brushes of the prior art that are adapted to clean the sides of the vehicle including the windows thereof are normally of long bristle length to insure that the cylindrical brush can accommodate the varying contour on the exterior of the vehicle. This is necessary when the vehicle windows and body proper are being cleaned by the same brush. Necessarily, this presents the limitation that either direction of rotation of the cylindrical brush will not allow reaching certain areas that are perpendicularly disposed with respect to the surface of the vehicle, such as window ledges. In addition, the prior art devices normally utilize the force of rotation of the cylindrical brushes to work their way back along the side of a vehicle and, consequently, these long bristled cylindrical brushes will skip the vertical window ledge near the rear seat of a vehicle because of its angular disposition.

The present invention contemplates the solution to the aforementioned problems by providing vehicle cleaning apparatus comprising first means acting as a support, second means adapted for pivotal movement with respect to the first means, and third means being rotatable on an axis generally normal to the side surface of a vehicle to be cleaned and carried by the second means for contacting the side of a vehicle to clean same. More specifically, the second means includes a parallelogram linkage carrying a motor having an axis of rotation slightly non-perpendicular with respect to a vertical support. The motor drives a brush that is in interference with a vehicle passing through a car washing area, and the brush is frusto-conical in shape. The entire mechanism is gravity biased toward a position of furthest extension toward the path a vehicle travels so that it can automatically accommodate narrow width cars and then is merely moved back by the force of a vehicle going through the car wash area to accommodate wider vehicles. The motor has an axis of rotation which is also slightly non-perpendicular with respect to the vehicle to be cleaned and, therefore, end brush washing action takes place on the window glass proper thereby insuring that areas of the window sill that are perpendicular with respect to the surface of the vehicle are properly cleaned regardless of window contour or vehicle width.

Accordingly, it is an object of the present invention to provide improved vehicle cleaning apparatus comprising first means acting as a support, second means adapted for pivotal movement with respect to the first means, and third means being rotatable on an axis slightly out of perpendicularity with respect to the side of the vehicle to be cleaned and carried by the second means for contacting the side of the vehicle to clean same.

It is another object of the present invention to provide improved vehicle cleaning apparatus wherein the cleaning means is adapted to follow the contour of the window area of a vehicle.

It is still another object of the present invention to provide improved vehicle cleaning apparatus according to the previous objects wherein the cleaning means includes a portion in interference with the vehicle passing through the car washing area and wherein the axis of rotation of a brush is slightly non-perpendicular to the surface of a vehicle irrespective of vehicle width.

It is a further object of the present invention to provide improved vehicle cleaning apparatus according to the previous objects wherein the cleaning means is carried by a parallelogram linkage that is gravity biased toward the vehicle to be cleaned.

It is still a further object of the present invention to provide improved vehicle cleaning apparatus wherein means are provided to automatically sense the width of a given vehicle so as to position the cleaning means against the surface to be cleaned without directing a shock thereto.

Other objects and attendant advantages of the present invention will be readily appreciated as the same becomes better understood by reference to the following detailed description when considered in connection with the accompanying drawings wherein:

FIG. 1 is a perspective view of the subject invention.

FIG. 2 is a plan view of the subject invention shown in its operative extremes of movement.

FIG. 3 is a sectional view along line 3—3 of FIG. 2.

Referring to FIG. 1, first means generally designated by numeral 10 is shown. First means 10 comprises a vertical support 12 which projects upwardly from the ground and takes the form of an elongated beam. Vertical support 12 is tilted slightly, as shown in an exaggerated manner in FIG. 3, opposite to the direction of vehicle travel so that second means in the form of a carriage generally designated by numeral 14, tends to assume a position perpendicular with respect to vertical support 12 by the force of gravity. Vertical support 12 is supported in any suitable way such as by base 16 which is fixed with respect to the vehicle to be cleaned.

Second means 14 generally comprises a parallelogram linkage formed by cross member 18 welded or attached in a fixed manner to vertical support 12, parallel link arms 20 and 22 carried by and pivotable with respect to cross-member 18, and link 24. Pivot pins 26, 28, 30 and 32 respectively connect base 18, arms 20 and 22, and link 24 to form a parallelogram linkage. Element 34, carried by cross-member 18 and projecting upwardly therefrom will restrict movement of the parallelogram linkage to an arc less than 90° and to the right as shown by the phantom lines in FIG. 2. Therefore, the entire parallelogram linkage is biased by the force of gravity to a point substantially perpendicular to vertical support 12 which is the position seen in FIG. 1 and in full lines in FIG. 2.

Third means, generally designated by numeral 36, is adapted to follow the contour of the window area of a vehicle passing thereby. Third means 36 includes a motor 38 having an axis of rotation slightly angularly disposed from a line perpendicular with respect to the vehicle to be cleaned and, consequently, slightly nonperpendicular relative to support 12. In other words, the axis of rotation of motor 38 is normally disposed at some angle other than 90° with respect to member 18 for reasons hereinafter explained. Motor 38 is freely pivotable on axis 40 that is perpendicular to but offset from the rotational axis of motor 38, and this provides means for adapting the third means to follow the contour of the window area of a vehicle. Motor 38 rotationally drives frusto-conical shaped brush 42 and due to the relationship of the rotational axis of motor 38, brush 42 is slightly tilted and has the trailing edge of the periphery thereof more heavily contacting the vehicle to be cleaned in the same fashion as a buffing brush. This slight tilt of brush 42 is maintained regardless of the window contour or vehicle width.

Referring to FIG. 2, a two-way cushioning air cylinder 44 is connected between fixed cross-member 18 and pivotable arm 20 so that the movement of the parallelogram linkage is restricted for reasons to be hereinafter described. Second means 14 includes a guard portion 46 extending from opposite ends of link 24 and is adapted to contact a vehicle to be cleaned before third means 36. Portion 46 extends from link 24 approximately the same distance as brush 42 but is slightly inboard thereof so that brush 42, when slightly cocked as shown in FIG. 2, extends beyond the outermost extension of portion 46. The vehicle striking extension, or guard portion 46, swings second means 14 away from the vehicle against the restraint of air cylinder 44 but allows the front or leading edge of brush 42 to contact the window area without becoming entangled with an antenna, for example. Therefore, the contour of portion 46 is such that an antenna cannot move between the back of brush 42 and its pivot shaft.

In operation, the subject vehicle cleaning apparatus is situated at some selected station on an assembly line type semi-automatic car wash and is normally disposed as shown by the solid lines in FIG. 2. Assuming that a vehicle is moving past the subject invention from the right, as viewed in FIG. 2, an antenna or some other obstruction near the front of the vehicle will initially contact portion 46 and swing second means 14 and third means 36 attached thereto in a clockwise direction as viewed in FIG. 2. Depending on the width of the car, parallelogram linkage will move toward the position shown by the dotted line in FIG. 2. Motor 38 is preferably rotating constantly. Due to the freedom of movement of the parallelogram linkage, air cylinder 44 cushions the clockwise movement of the parallelogram linkage so that it does not overtravel, and when it returns toward the vehicle, due to the angular disposition of the vertical support 12, will not bounce on the surface of the vehicle.

Brush 42, as seen in FIG. 2, is slightly cocked so that the trailing edge of the brush more heavily bears on the vehicle window thereby engendering a more complete cleaning action. The parallelogram linkage is completely free to move in a clockwise direction from that shown by the solid lines in FIG. 2 against the bias of air cylinder 44 and, therefore, will follow any contour of the windows of the vehicle to insure the complete cleaning thereof. Motor 38 pivots up and down and adds its weight to the force of the brush as well as accommodating vertical window contours. When the vehicle has completely passed the vehicle cleaning apparatus herein described, the parallelogram linkage will automatically assume a position as shown by the solid line in FIG. 2 thereby returning the device to a position awaiting another cycle of operation.

It is understood that several of the subject devices can be situated on either side of a vehicle passing through a car wash and, of course, in that installation the left side of the vehicle would be washed by a similar device but having an opposite direction of rotation. It is also to be noted that the parallelogram linkage cannot go further counterclockwise than shown in FIG. 2 due to the interference set up between fixed element 34 and movable arm 20. This insures that the subject vehicle cleaning apparatus is normally located at its furthest most extension toward a vehicle to be cleaned and will automatically compensate for any wider vehicle. Therefore, in a typical installation the apparatus will be designed to accommodate the narrowest vehicle expected through a car wash system and will, therefore, accommodate the wider vehicles.

The subject invention has the distinct advantage of being completely automatic in operation depending only on the force of gravity to cycle and, therefore, does not require sophisticated control mechanisms. Motor 38 is of relatively low horsepower so it is merely left running at all times the car wash is in operation, and it does not need monitoring by an operator to effectively carry out its function. It automatically adjusts to the width of cars and also senses obstructions that could possibly entangle in the constantly moving brush thereby automatically bringing the rotating brush out of contact with items of the vehicle that could be damaged. Additionally, the subject invention is sufficiently portable so that it can be moved from place to place and situated in a car wash type building at any convenient point since it is relatively lightweight and likewise requires very little maintenance due to its simplicity of construction.

The invention has been described in an illustrative manner, and it is to be understood that the terminology which has been used is intended to be in the nature of words of description rather than of limitation.

Obviously, many modifications and variations of the present invention are possible in light of the above teachings.

The embodiments of the present invention in which an exclusive property or privilege is claimed are defined as follows:

1. Apparatus for cleaning the side windows and adjacent surfaces of an automobile moving longitudinally through a washing area comprising: an open face conical brush, support means, carriage means for mounting the brush on the support means substantially facing the side windows to be cleaned and permitting the brush to be displaced laterally relative to the support means without substantial variation in the angularity of the brush, the carriage means being normally biased to displace the brush fully laterally into the washing area whereby contact with a moving automobile causes the brush to be displaced laterally toward the support means, and a motor carried by the carriage means for driving the brush about an axis of rotation.

2. Apparatus as defined in claim 1 wherein the motor and brush are mounted on the carriage for pivotal movement about a substantially horizontal axis parallel to the direction of automobile movement to permit the conical brush to adjust itself to varying angularities of side windows.

3. Apparatus as defined in claim 1 wherein the axis of rotation of the brush is skewed about a substantially vertical axis such that the leading edge of the brush encountered by a moving vehicle more lightly engages the side windows than does the trailing edge of the brush.

4. Apparatus as defined in claim 1 including guard means on the carriage means for contacting an advancing automobile.

5. Apparatus as defined in claim 1 wherein the carriage means comprises a parallelogram linkage having a fixed cross bar mounted on the support means, a pair of pivot arms pivotally mounted on the opposite ends of the cross bar and a support bar carrying the motor and being pivotally mounted at the opposite ends thereof to respective pivot arms such that the pivot arms may pivot about substantially vertical axes to accomplish the lateral displacement of the brush.

6. Apparatus as defined in claim 5 wherein the pivot axes of the pivot arms are angled slightly away from vertical to accomplish the bias of the carriage means laterally fully into the washing area, and means for limiting the pivotal displacement of the pivot arms at the full lateral displacement point such that the brush and support bar are displaceable in the direction of automobile movement upon initial contact therewith.

7. Apparatus as defined in claim 5 wherein the support means is a rigid standard disposed slightly away from the vertical to bias the pivot arms toward the full lateral extension thereof into the washing area.

8. Apparatus as defined in claim 1 including means for damping the lateral displacement of the brush relative to the support means.

References Cited

UNITED STATES PATENTS 2,960,707  11/1960  McDermott.
3,233,264  2/1966  Nickl et al.

OTHER REFERENCES

Auto Laundry News; June 1965, p. 33.

EDWARD L. ROBERTS, Primary Examiner

U.S. Cl. X.R.

15—53